(12) United States Patent  (10) Patent No.: US 8,826,295 B2
Won  (45) Date of Patent: Sep. 2, 2014

(54) APPARATUS AND METHOD FOR ADAPTIVE CONTEXT SWITCHING SCHEDULING SCHEME FOR FAST BLOCK INPUT AND OUTPUT

(75) Inventor: Youjip Won, Gyeonggi-do (KR)

(73) Assignee: IUCF-HYU (Industry-University Cooperation Foundation Hangyang University), Seoul (KR)

( * ) Notice: Subject to any disclaimer, the term of this patent is extended or adjusted under 35 U.S.C. 154(b) by 159 days.

(21) Appl. No.: 13/112,671

(22) Filed: May 20, 2011

(65) Prior Publication Data

US 2011/0239225 A1  Sep. 29, 2011

Related U.S. Application Data

(63) Continuation of application No. PCT/KR2009/006992, filed on Nov. 25, 2009.

(30) Foreign Application Priority Data

Nov. 26, 2008  (KR) .................. 10-2008-0118331

(51) Int. Cl.
   *G06F 9/46*  (2006.01)
(52) U.S. Cl.
   USPC ............................................. 718/108; 718/1

(58) Field of Classification Search
   None
   See application file for complete search history.

(56) References Cited

U.S. PATENT DOCUMENTS

| 6,085,277 | A | 7/2000 | Nordstrom et al. | |
| 2004/0030816 | A1* | 2/2004 | Knight et al. | 710/52 |
| 2004/0215847 | A1 | 10/2004 | Dirstine et al. | |
| 2006/0161924 | A1* | 7/2006 | Di Gregorio | 718/107 |
| 2006/0224726 | A1* | 10/2006 | Shimada et al. | 709/224 |
| 2008/0165800 | A1* | 7/2008 | Chen et al. | 370/465 |
| 2009/0024817 | A1* | 1/2009 | Oved | 711/170 |

FOREIGN PATENT DOCUMENTS

| WO | WO 2004/059426 A2 | 7/2004 |
| WO | WO 2008/139301 A2 | 11/2008 |

\* cited by examiner

*Primary Examiner* — Meng An
*Assistant Examiner* — Bradley Teets

(57) ABSTRACT

Provided is a method and apparatus for an adaptive context switching for a fast block input/output. The adaptive context switching method may include: requesting, by a process, an input/output device to perform an input/output of data; comparing a Central Processing Unit (CPU) effectiveness based on whether the context switching is performed; and performing the input/output through the context switching to a driver context of the input/output device, or directly performing, by the process, the input/output based on a comparison result of the CPU effectiveness.

16 Claims, 5 Drawing Sheets

APPARATUS AND METHOD FOR ADAPTIVE CONTEXT SWITCHING SCHEDULING SCHEME FOR FAST BLOCK INPUT AND OUTPUT

CROSS REFERENCE TO RELATED APPLICATIONS

This patent application is a continuation of pending PCT Application No. PCT/KR2009/006992, filed Nov. 25, 2009, which claims the benefit of Korean Application No. 10-2008-0118331, filed Nov. 26, 2008, the entire teachings and disclosure of which are incorporated herein by reference thereto.

FIELD OF THE INVENTION

The present invention relates to a method and apparatus for an adaptive context switching for a fast block input/output, and more particularly, to a method and apparatus for appropriately performing a context switching based on a change of hardware by determining whether to perform an input/output through the context switching or to directly perform the input/output using a process.

BACKGROUND OF THE INVENTION

In a conventional art, when a process executes an input/output, a performance of a block input/output device is slow compared to a Central Processing unit (CPU) or a memory. Therefore, to decrease a bottleneck effect of the block input/output device, an input/output scheduler may allocate the CPU to another process, and execute the process having requested the input/output after a device driver completes a block calculation. In this instance, although a context switching function should be used to enhance the entire system performance, an overload on the CPU may occur when the context switching is performed.

With developments in a memory industry, an input/output speed of a memory-based block input/output device is very fast compared to a hard disk and may become much faster. Specifically, in a particular situation, to not perform the context switching may become a gain in aspects of an input/output response speed and a system performance.

Accordingly, there is a need for a method and apparatus for a context switching that may determine whether a context switching is to be performed to enhance a system performance, and thereby selectively perform the context switching as necessary.

SUMMARY OF THE INVENTION

An aspect of the present invention provides a method and apparatus for an adaptive context switching that, when a predetermined condition is satisfied, may not perform a context switching when a process executes an input/output and thereby enables a quick response on the side of the process having requested the input/output.

Another aspect of the present invention provides a method and apparatus for an adaptive context switching that may determine whether a context switching is performed based on a CPU effectiveness, when a process executes an input/output, and thereby may enhance a use effectiveness of a CPU.

According to an aspect of the present invention, there is provided a method for an adaptive context switching for a fast block input/output, the method including: requesting, by a process, an input/output device to perform an input/output of data; comparing a Central Processing Unit (CPU) effectiveness based on whether the context switching is performed; and performing the input/output through the context switching to a driver context of the input/output device, or directly performing, by the process, the input/output based on a comparison result of the CPU effectiveness.

The method may further include determining whether the input/output device corresponds to a fast block device. When the input/output device corresponds to the fast block device, the comparing through the performing of the input/output may be performed.

The comparing may include comparing the CPU effectiveness according to a first input/output operation where the process having requested the input/output directly performs the input/output, and the CPU effectiveness according to a second input/output operation where the input/output is performed through the context switching to the driver context of the input/output device.

The performing of the input/output may include performing the first input/output operation when the CPU effectiveness according to the first input/output operation is greater than the CPU effectiveness according to the second input/output operation, and performing the second input/output operation when the CPU effectiveness according to the second input/output operation is greater than the CPU effectiveness according to the first input/output operation.

The comparing may include calculating and comparing the CPU effectiveness based on an amount of time used for the input/output, and an amount of time used for allocating a CPU to the process and thereby processing the calculation.

The method may further include verifying whether the input/output device uses a Direct Memory Access (DMA).

The performing of the input/output may include: determining whether a request in a response standby state exists in a queue of the input/output device; and performing the input/output through the context switching to the driver context of the input/output device when the request exists.

According to another aspect of the present invention, there is provided an apparatus for an adaptive context switching for a fast block input/output, the apparatus including: an input/output request unit to request, by a process, an input/output device to perform an input/output of data; a CPU effectiveness comparison unit to compare a CPU effectiveness based on whether the context switching is performed; and an input/output performing unit to perform the input/output through the context switching to a driver context of the input/output device, or directly performing, by the process, the input/output based on a comparison result of the CPU effectiveness.

The apparatus may further include a DMA utilization verifying unit to verify whether the input/output device uses a DMA. The CPU effectiveness comparison unit may include: a CPU effectiveness calculation unit to calculate the CPU effectiveness according to a first input/output operation where the process having requested the input/output directly performs the input/output, and the CPU effectiveness according to a second input/output operation where the input/output is performed through the context switching to the driver context of the input/output device; and an effectiveness comparison unit to compare the CPU effectiveness according to the first input/output operation with the CPU effectiveness according to the second input/output operation.

The CPU effectiveness calculation unit may include: a first CPU effectiveness calculation unit to calculate the CPU effectiveness according to the first input/output operation and the CPU effectiveness according to the second input/output operation, when the input/output device does not use the DMA; and a second CPU effectiveness calculation unit to calculate the CPU effectiveness according to the first input/ output operation and the CPU effectiveness according to the second input/output operation, when the input/output device uses the DMA.

According to embodiments of the present invention, there may be provided a method and apparatus for an adaptive context switching that, when a predetermined condition is satisfied, may not perform a context switching when a process executes an input/output and thereby enables a quick response on the side of the process having requested the input/output.

Also, according to embodiments of the present invention, there may be provided a method and apparatus for an adaptive context switching that may determine whether a context switching is performed based on a CPU effectiveness, when a process executes an input/output, and thereby may enhance a use effectiveness of a CPU.

DETAILED DESCRIPTION OF THE INVENTION

Figure 1:
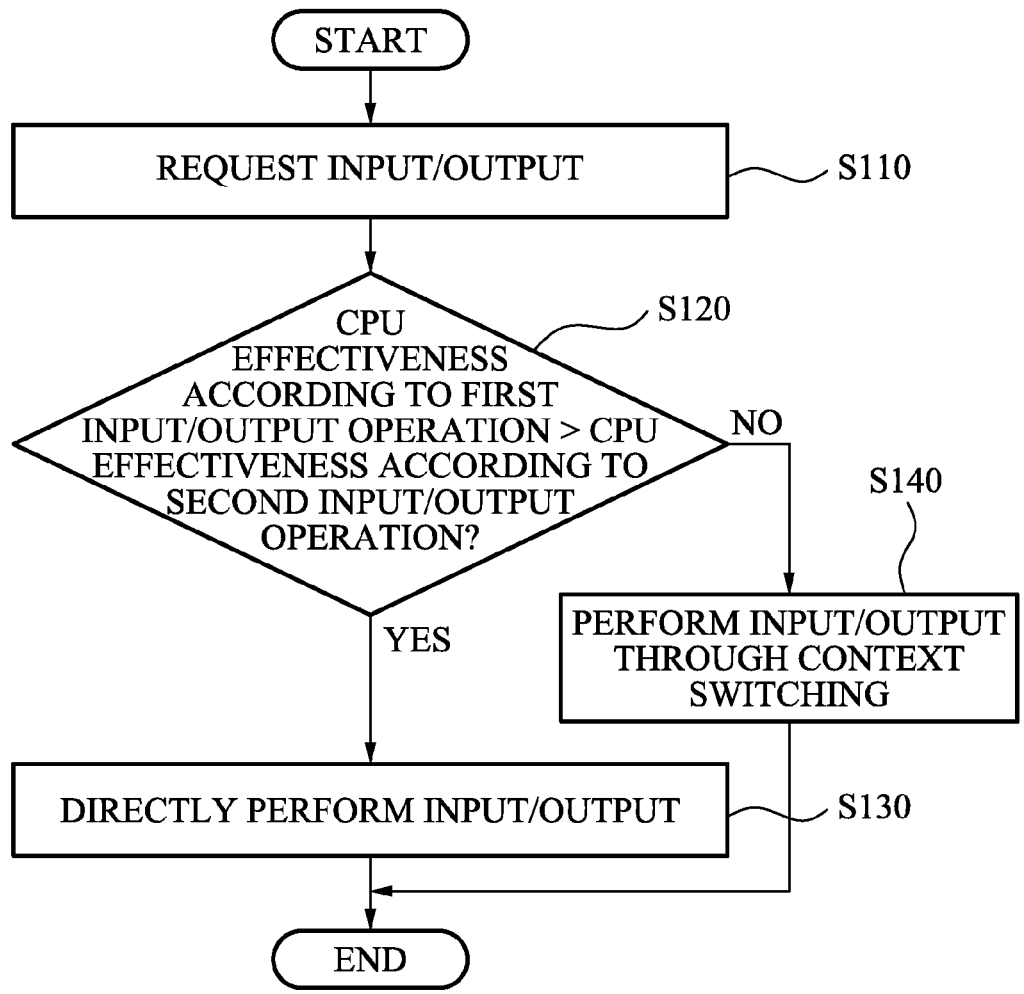
FIG. 1 is a flowchart illustrating a method for an adaptive context switching for a fast block input/output according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a flowchart illustrating a method for an adaptive context switching for a fast block input/output according to an embodiment of the present invention.

In operation S110, a process may request an input/output device to perform an input/output of data. Specifically, when the process having requested the input/output desires to input or output the data, the process may request the input/output of the data. Hereinafter, a data input/output operation will be described based on, for example, a data read operation.

The method for the adaptive context switching for the fast block input/output may further include verifying whether the input/output devices uses a Direct Memory Access (DMA). The DMA denotes a hardware mechanism that allows a memory to directly transmit and receive input/output data without using a main Central Processing Unit (CPU) in a block input/output. At least one of an input/output response time and a CPU effectiveness may be considered to determine whether the context switching is performed. Here, the CPU effectiveness may be differently calculated with respect to a case where the DMA is used and a case where the DMA is not used. Accordingly, whether the DMA is used may be initially verified.

In operation S120, the CPU effectiveness may be compared based on whether the context switching is performed. Specifically, based on whether the context switching is performed, it is possible to compare the CPU effectiveness according to a first input/output operation where the process having requested the input/output directly performs the input/output, and the CPU effectiveness according to a second input/output operation where the input/output is performed through the context switching to a driver context of the input/output device.

An operation of calculating the input/output response time and the CPU effectiveness will be further described with reference to FIGS. 3 and 4.

Figure 3:
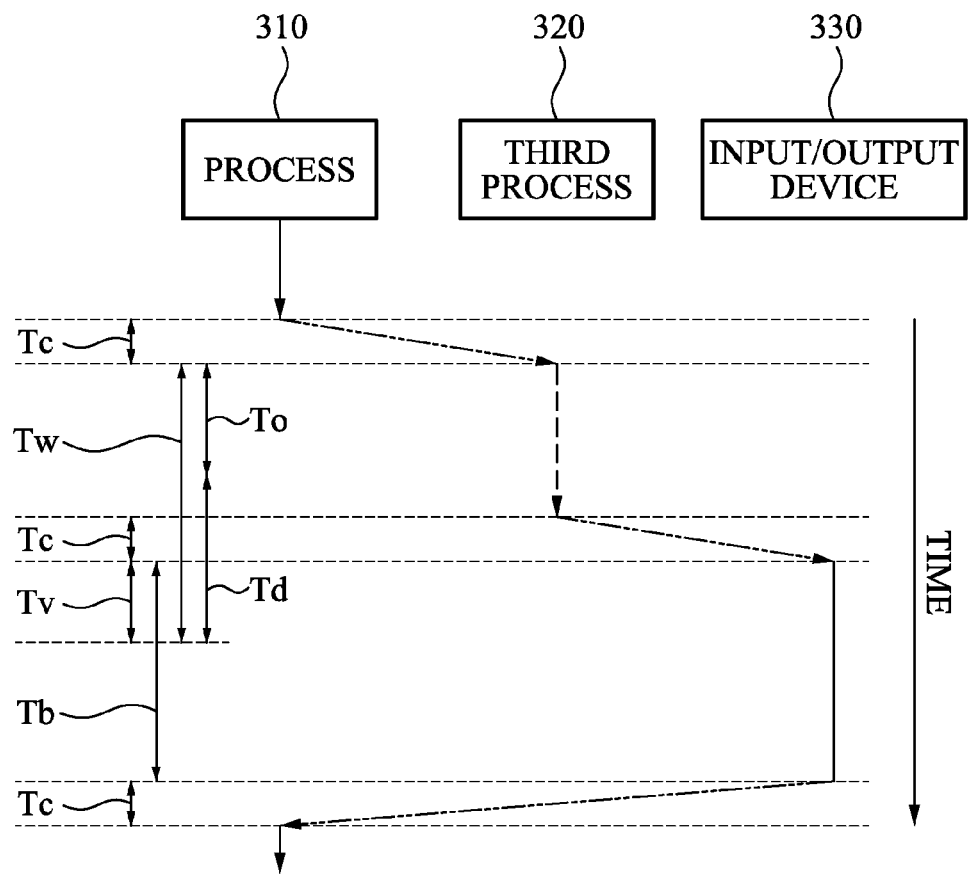
FIG. 3 is a diagram illustrating a flow of different times needed when a context switching is performed according to an embodiment of the present invention.

FIG. 3 is a diagram illustrating a flow of different times needed when a context switching is performed according to an embodiment of the present invention.

FIG. 3 shows an amount of time used for each of a process 310 having requested an input/output, a third process 320, and an input/output device 330 when the input/output is performed through the context switching. In FIG. 3, Tc denotes an amount of time used for the context switching and Tw denotes an amount of response standby time until an interrupt is received from the input/output device 330. Tw includes To and Td. To may include at least one of an input/output command process time, a seek time, and a rotation delay time. Td denotes an amount of time used to read data from a physical disk, and to transmit the read data to a buffer cache. Tb denotes an amount of time used to transmit the data from a buffer cache of a disk to a memory via a bus. A temporally overlapping interval may occur between Td and To. The temporally overlapping interval may be defined as Tv. Specifically, Tv may correspond to an overlapping interval that may occur during a process of generating the interrupt and transmitting the data to the memory via the bus in a state where a data transmission is not completed, when transmitting the data from the disk to the buffer cache. The process 310 having requested the input/output may be in a sleep state until the data transmission is entirely completed. When the data transmission is completed, a scheduler may wake the process 310 in the sleep state whereby an operation may proceed. An amount of time used for the process 310 having requested the input/output to enter the sleep state and be awaken is referred to as the amount of input/output response time. An example of the input/output response time when the context switching is performed may be expressed by the following Equation 1:

$$R_{cs}=T_w+T_b+2\cdot T_c-T_v \qquad \text{[Equation 1]}$$

Figure 4:
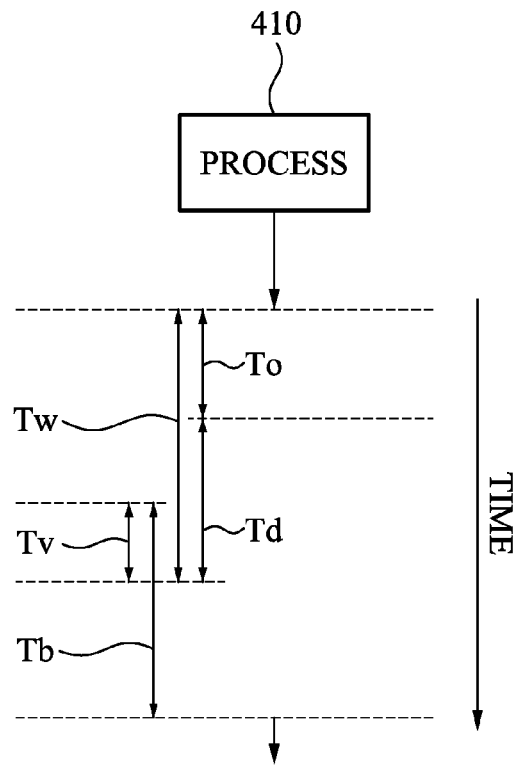
FIG. 4 is a diagram illustrating a flow of different times needed when an input/output is directly performed without performing a context switching according to an embodiment of the present invention.

FIG. 4 is a diagram illustrating a flow of different times needed when a process 410 having requested an input/output directly performs the input/output without performing a context switching according to an embodiment of the present invention. For a period of time corresponding to Tw−Tv without performing the context switching, the process 410 may be waiting until a data transmission preparation interrupt is received from a disk, and may transmit data during a period of time corresponding to Td using a CPU. Accordingly, an input/output response time when the process 410 having requested the input/output directly performs the input/output may be expressed by the following Equation 2:

$$R_{acs}=T_w+T_b-T_v \qquad \text{[Equation 2]}$$

Based on a comparison between the above Equation 1 and Equation 2, it can be known that, when the process 410 directly performs the input/output, an amount of time of 2×Tc may be saved. However, when the process 410 directly performs the input/output, the CPU may not allocate an amount of time corresponding to Tw−Tv to another process. Therefore, it is possible to additionally review a CPU effectiveness. Accordingly, the CPU effectiveness may be expressed by the following Equation 3:

$$E = \frac{T_r}{T_{io}} \qquad \text{[Equation 3]}$$

Tio denotes an input/output response time used until the input/output is completed, and Tr denotes an actual amount of time a CPU is allocated to the process 410 and processing of the calculation. When the context switching is performed, the CPU may be allocated to another device for a period of time corresponding to Tw to process the calculation, and a driver context of an input/output device may process an input/output request for a period of time corresponding to Tb. Accordingly, when the input/output device performs the context switching without using the DMA, the CPU effectiveness may be expressed by the following Equation 4:

$$E_{cs} = \frac{T_w + T_b}{T_w + T_b + 2 \cdot T_c - T_v} \qquad \text{[Equation 4]}$$

When the input/output is directly performed, the CPU may need to wait for a period of time corresponding to Tw until an interrupt is received from the input/output device. Therefore, the standby time may not be included in Tr. Only Tb where the input/output is executed may be included in Tr. Accordingly, when the input/output is directly performed, the CPU effectiveness may be expressed by the following Equation 5:

$$E_{acs} = \frac{T_b}{T_w + T_b - T_v} \qquad \text{[Equation 5]}$$

Here, a criterion to determine whether to directly perform the input/output when the DMA is not used may include an excellent performance in an aspect of the input/output response time. In an aspect of the CPU effectiveness, for example, the input/output may be directly performed when the following Equation 6 is satisfied, Equation 6 being given by:

$$E_{acs} > E_{cs} \qquad \text{[Equation 6]}$$

The CPU effectiveness when the DMA is used may be calculated to be different from the CPU effectiveness when the DMA is not used. When the DMA is used, it may be classified into a case where the CPU directly performs the input/output in a process context, or into a case where the DMA is used after the context switching to the driver context of the input/output device is performed. In an aspect of the input/output response time, to perform the input/output without performing the context switching may not use a time used for the context switching and thus be more advantageous. However, in an aspect of the CPU effectiveness, when the context switching is performed, it is possible to process both Tw and Tb using the DMA. During the above period of time, the scheduler may allocate the CPU to another process. Accordingly, it is possible to utilize an amount of time corresponding to twice an amount of time of Tw+Th. Accordingly, when the context switching is performed by using the DMA, the CPU effectiveness may be expressed by the following Equation 7:

$$E_{cs\_dma} = \frac{(T_w + T_b) \cdot 2}{T_w + T_b + 2 \cdot T_c - T_v} \qquad \text{[Equation 7]}$$

When the process having requested the input/output performs the input/output without attempting the context switching, the CPU effectiveness may be expressed the same as in the above Equation 5. Therefore, when the process directly performs the input/output using the DMA, the CPU effectiveness may be expressed by the following Equation 8:

$$E_{acs\_dma} = \frac{T_b}{T_w + T_b - T_v} \qquad \text{[Equation 8]}$$

Accordingly, when the process directly performs the input/output using the DMA, the CPU effectiveness may be expressed by the following Equation 9:

$$E_{acs\_dma} > E_{cs\_dma} \qquad \text{[Equation 9]}$$

The aforementioned schemes of calculating the input/output response time and the CPU effectiveness are only examples and thus it is possible to calculate the input/output response time and the CPU effectiveness using various types of schemes and equations.

Accordingly, the adaptive context switching may classify whether the DMA is used, whereby the process having requested the input/output may directly perform the input/output when the above Equation 6 or Equation 9 is satisfied.

Here, the process having requested the input/output may directly perform the input/output only when a request in a response standby state does not exist in a queue of the input/output device. Specifically, when the request exists, the process may perform the context switching.

Referring again to FIG. 1, in operation S130, the process may perform the input/output based on the comparison result. Specifically, when the CPU effectiveness according to the first input/output operation is greater than the CPU effectiveness according to the second input/output operation, the process may perform the first input/output operation. When the CPU effectiveness according to the second input/output operation is greater than the CPU effectiveness according to the first input/output operation, the process may perform the second input/output operation.

Also, operation S130 may include determining whether a request in a response standby state exists in a queue of the input/output device exists, and performing the input/output through the context switching to the driver context of the input/output device when the request exists. Specifically, only when the response in the response standby state does not exist in the queue of the input/output device, may the adaptive context switching scheme be performed. When the request exists in the queue of the input/output device, the input/output may be performed only through the context switching.

Also, the adaptive context switching method may further include determining whether the input/output device corresponds to a fast block device. When the input/output device corresponds to the fast block device, operations S110 through S130 may be performed.

According to an embodiment of the present invention, when a process executes an input/output, whether a context switching is performed may be determined based on a CPU effectiveness. Through this, it is possible to enhance a use effectiveness of a CPU, and to obtain a quick response time.

Figure 2:
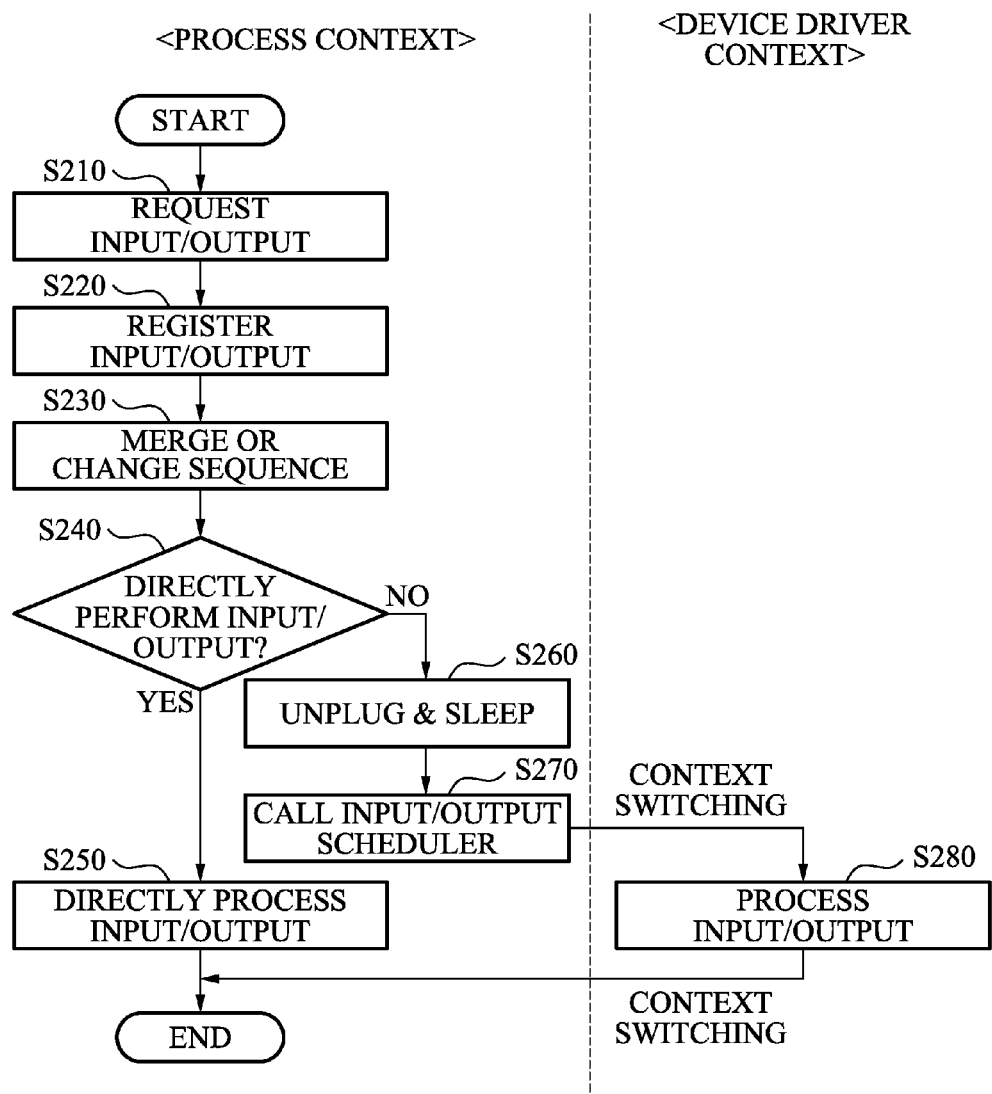
FIG. 2 is a flowchart illustrating a process of performing an input/output process based on whether a context switching is performed according to an embodiment of the present invention.

FIG. 2 is a flowchart illustrating a process of performing an input/output process based on whether a context switching is performed according to an embodiment of the present invention.

Referring to FIG. 2, in operation S210, a process may request an input/output of data.

In operation S220, the process may register the input/output in a block input/output structure in a kernel mode.

In operation S230, the process may merge the input/output with an input/output waiting in a current device or change a sequence the input/output in order to decrease a motion of a head of a disk drive. To handle the input/output as above may be performed using an elevator algorithm, and may be performed based on a Logical Block Address (LBA) on a system side.

In operation S240, the process having requested the input/output may determine whether to perform the input/output directly or through the context switching. At least one of an input/output response time and a CPU effectiveness may be considered to determine whether to perform the input/output directly or through the context switching.

In operation S250, when the process having requested the input/output determines to directly perform the input/output, the process may directly process the input/output.

Conversely, when the process having requested the input/output determines to perform the input/output through the context switching instead of directly processing the input/output, the process may be switched to an unplug and sleep state in operation S260, and may call an input/output scheduler in operation S270. In this instance, the context switching from a process context to a device driver context may occur.

In operation S280, a device driver may process the input/output one by one until all the input/output is completed. When the input/output is completed, the context switching may occur again and the input/output scheduler may wake the process in the sleep state.

Specifically, a system performance may be enhanced by selectively determining whether the context switching is performed based on the input/output response time and the CPU effectiveness.

Figure 5:
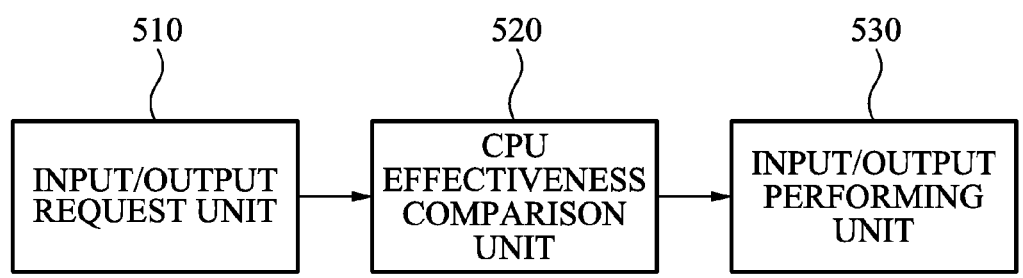
FIG. 5 is a block diagram illustrating a configuration of an apparatus for an adaptive context switching for a fast block input/output according to an embodiment of the present invention.
Figure 6:
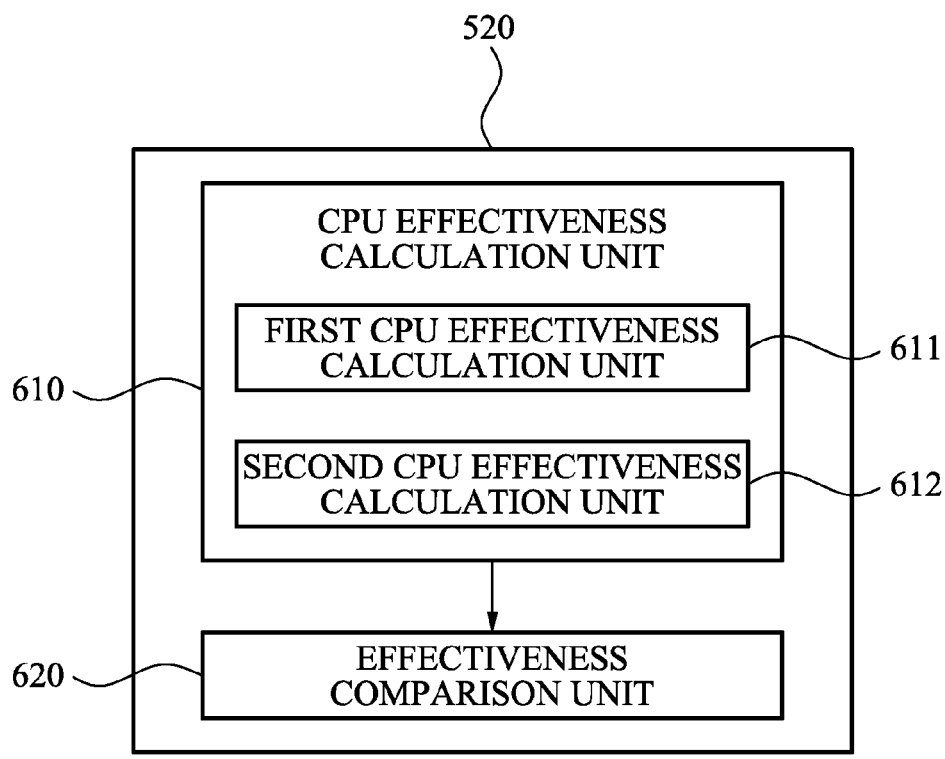
FIG. 6 is a block diagram illustrating a configuration of a CPU effectiveness comparison unit of FIG. 5.

FIG. 5 is a block diagram illustrating a configuration of an apparatus for an adaptive context switching for a fast block input/output according to an embodiment of the present invention. FIG. 6 is a block diagram illustrating a configuration of a CPU effectiveness comparison unit of FIG. 5.

Referring to FIG. 5, the adaptive context switching apparatus may include an input/output request unit 510, a CPU effectiveness comparison unit 520, and an input/output performing unit 530. The adaptive context switching apparatus may further include a DMA utilization verifying unit (not shown).

A process may request an input/output device (not shown) to perform an input/output, using the input/output request unit 510.

The DMA utilization verifying unit may verify whether the input/output device uses a DMA.

The CPU effectiveness comparison unit 520 may compare a CPU effectiveness based on whether the context switching is performed. Hereinafter, a configuration of the CPU effectiveness comparison unit 520 will be further described.

Referring to FIG. 6, the CPU effectiveness comparison unit 520 may include a CPU effectiveness calculation unit 610 and an effectiveness comparison unit 620.

A first CPU effectiveness calculation unit 611 may calculate the CPU effectiveness according to a first input/output operation where the process having requested the input/output directly performs the input/output, and the CPU effectiveness according to a second input/output operation where the input/output is performed through the context switching to the driver context of the input/output device, when the input/output device does not uses a DMA. A second CPU effectiveness calculation unit 612 may calculate the CPU effectiveness according to the first input/output operation and the CPU effectiveness according to the second input/output operation, when the input/output device uses the DMA. The first CPU effectiveness calculation unit 611 and the second CPU effectiveness calculation unit 612 may be included in the CPU effectiveness calculation unit 610.

The effectiveness comparison unit 620 may compare the CPU effectiveness according to the first input/output operation and the CPU effectiveness according to the second input/output operation. Specifically, based on whether the input/output device uses the DMA, the effectiveness comparison unit 620 may compare the CPU effectiveness calculated when the process directly performs the input/output, with the CPU effectiveness calculated when the process performs the input/output through the context switching.

Referring again to FIG. 5, the input/output performing unit 530 may perform the input/output based on the comparison result. Specifically, the process having requested the input/output may perform the input/output directly or through the context switching based on the comparison result of the CPU effectiveness.

Since the context switching is selectively performed in the input/output of data in order to further effectively use a main CPU according to a change of hardware, it is possible to more adaptively cope with the change of hardware, and to enhance a system performance.

In computing-based embedded systems, for example, a television (TV), a portable multimedia player (PMP), an ultra mobile PC (UMPC), a notebook, and the like, when a context switching is performed every time an input/output request is received, overload may occur in loading a small amount of data. Also, a booting time may increase. Accordingly, a booting time may decrease in a computing-based system by selectively performing the context switching.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method for adaptive context switching within an apparatus comprising a Central Processing Unit (CPU), the method comprising:
   requesting, by a process executing within the CPU, an input/output device to perform an input/output of data;
   calculating a first effectiveness of the CPU, where context switching to a driver context of the input/output device is performed, the calculation being different based on whether or not the device use Direct Memory Access (DMA), the first effectiveness of the CPU including an amount of time allocated to the driver context of the input/output device;
   calculating a second effectiveness of the CPU, where no context switching is performed and the input/output is directly performed by the process, the second effectiveness of the CPU including an amount of time the CPU is allocated to the process;

comparing the first effectiveness of the CPU to the second effectiveness of the CPU;
selecting a way to perform the input/output between performing the context switching to a driver context of the input/output device, and directly performing, by the process, the input/output based on a result of the comparison of the first effectiveness of the CPU and the second effectiveness of the CPU; and
performing the input/output using the selected way.

2. The method of claim 1, further comprising:
determining whether the input/output device corresponds to a fast block device, and calculating the first effectiveness and the second effectiveness based on that determination.

3. The method of claim 1, wherein the performing of the input/output comprises performing the first input/output operation when the first effectiveness according to the first input/output operation is greater than the second effectiveness according to the second input/output operation, and performing the second input/output operation when the second effectiveness according to the second input/output operation is greater than the first effectiveness according to the first input/output operation.

4. The method of claim 1, wherein, in the first input/output operation, the process having requested the input/output directly performs the input/output until the input/output is completed.

5. The method of claim 1, wherein the comparing comprises calculating and comparing the first effectiveness and second effectiveness based on an amount of time used for the input/output, and an amount of time used for allocating the CPU to the process and thereby processing the calculation.

6. The method of claim 1, further comprising:
verifying whether the input/output device uses the Direct Memory Access (DMA).

7. The method of claim 6, wherein the comparing comprises calculating an amount of time the CPU is allocated to the process and processing of the calculation, using a sum of an amount of response standby time until an interrupt is received from the input/output device, and an amount of time allocated to the driver context of the input/output device, when the input/output device performs the context switching without using the DMA.

8. The method of claim 6, wherein the comparing comprises calculating an amount of time the CPU is allocated to the process and processing of the calculation, using an amount of time allocated to the driver context of the input/output device, when the input/output device neither uses the DMA nor performs the context switching.

9. The method of claim 6, wherein the comparing comprises calculating an amount of time the CPU is allocated to the process and processing of the calculation, using a twice of an amount of time allocated to the driver context of the input/output device and an amount of response standby time until an interrupt is received from the input/output device, when the input/output device performs the context switching using the DMA.

10. The method of claim 6, wherein the comparing comprises calculating an amount of time the CPU is allocated to the process and processing of the calculation, using an amount of time allocated to the driver context of the input/output device, when the input/output device uses the DMA and does not perform the context switching.

11. The method of claim 1, wherein the performing of the input/output comprises:
determining whether a request in a response standby state exists in a queue of the input/output device; and
performing the input/output through the context switching to the driver context of the input/output device when the request exists.

12. An apparatus for an adaptive context switching, the apparatus comprising:
a Central Processing Unit (CPU);
an input/output request unit to request, by a process executing within the CPU, an input/output device to perform an input/output of data;
a calculation unit configured to calculate a first effectiveness of the CPU where context switching to a driver context of the input/output device is performed, the calculation being different based on whether or not the device use Direct Memory Access (DMA), the first effectiveness of the CPU including an amount of time allocated to the driver context of the input/output device;
the calculation unit configured to calculate a second effectiveness of the CPU, where no context switching is performed and the input/output is directly performed by the process, the second effectiveness of the CPU including an amount of time the CPU is allocated to the process;
a comparison unit to compare the first effectiveness of the CPU to the second effectiveness of the CPU; and
an input/output performing unit to select a way to perform the input/output, the input/output performing unit selecting between performing the context switching to a driver context of the input/output device, and directly performing, by the process, the input/output based on a result of the comparison of the first effectiveness and the second effectiveness, wherein the input/output performing unit performs the input/output using the selected way.

13. The apparatus of claim 12, wherein:
when the context switching is performed, the first effectiveness calculation unit calculates the amount of time the CPU is allocated to the process and processing of the calculation, using a sum of an amount of response standby time until an interrupt is received from the input/output device, and an amount of time allocated to the driver context of the input/output device, and
when the context switching is not performed, the first effectiveness calculation unit calculates the amount of time the CPU is allocated to the process and processing of the calculation, using the amount of time allocated to the driver context of the input/output device.

14. The apparatus of claim 12, wherein:
when the context switching is performed, the second effectiveness calculation unit calculates the amount of time the CPU is allocated to the process and processing of the calculation, using twice of an amount of time allocated to the driver context of the input/output device and an amount of response standby time until an interrupt is received from the input/output device, and
when the context switching is not performed, the second effectiveness calculation unit calculates the amount of time the CPU is allocated to the process and processing of the calculation, using the amount of time allocated to the driver context of the input/output device.

15. The apparatus of claim 12, further comprising:
a fast block device decision unit to determine whether the input/output device corresponds to a fast block device.

16. The apparatus of claim 12, wherein:
the input/output performing unit comprises:
a response standby decision unit to determine whether a request in a response standby state exists in a queue of the input/output device; and when the request exists, the input/output performing unit performs the input/output through the context switching to the driver context of the input/output device.

* * * * *